(12) United States Patent
Masudaya et al.

(10) Patent No.: US 7,705,718 B2
(45) Date of Patent: Apr. 27, 2010

(54) TIRE INFORMATION DETECTOR

(75) Inventors: Hideki Masudaya, Miyagi-ken (JP); Kenichi Tamagawa, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 297 days.

(21) Appl. No.: 11/880,367

(22) Filed: Jul. 20, 2007

(65) Prior Publication Data
US 2008/0169915 A1 Jul. 17, 2008

(30) Foreign Application Priority Data
Jul. 21, 2006 (JP) .............................. 2006-199604

(51) Int. Cl.
*B60C 23/00* (2006.01)
(52) U.S. Cl. ..................................... 340/447; 73/146.5
(58) Field of Classification Search ................ 340/447, 340/442–446; 73/146, 146.5
See application file for complete search history.

(56) References Cited
U.S. PATENT DOCUMENTS

| | | | |
|---|---|---|---|
| 5,982,279 A * | 11/1999 | Tominaga et al. ........... | 340/444 |
| 6,362,732 B1 * | 3/2002 | Konchin et al. ............. | 340/446 |
| 6,644,108 B2 * | 11/2003 | Inoue .......................... | 73/146 |
| 7,387,020 B2 * | 6/2008 | Masudaya ................... | 73/146.5 |
| 2007/0200644 A1 * | 8/2007 | Masudaya ................... | 331/158 |
| 2007/0241873 A1 * | 10/2007 | Masudaya ................... | 340/447 |
| 2008/0042819 A1 * | 2/2008 | Masudaya ................... | 340/447 |

* cited by examiner

*Primary Examiner*—John A Tweel, Jr.
(74) *Attorney, Agent, or Firm*—Brinks Hofer Gilson & Lione

(57) ABSTRACT

There is provided a tire information detector to promptly and accurately detect tire information such as pressure of a tire. The tire information detector includes a transponder including a resonator and disposed in a tire of a vehicle; and a controller disposed in a vehicle body, transmitting an excitation signal allowing the resonator to resonate to the transponder, receiving a resonance signal concerning a resonance frequency of the resonator, and calculating a measurement value in accordance with the resonance frequency of the resonator. The controller determines a frequency of the excitation signal based on the resonance frequency of the resonator obtained from previous communications with the transponder.

7 Claims, 5 Drawing Sheets

TIRE INFORMATION DETECTOR

This application claims the benefit of Japanese Patent Application No. 2006-199604 Jul. 21, 2006, which is hereby incorporated by reference.

BACKGROUND OF THE INVENTION

1. Field of the Invention

The present invention relates to a tire information detector, and more particularly, to a tire information detector for detecting tire information such as pressure of a tire used in a vehicle.

2. Description of the Related Art

In the related art, a radio transmission apparatus transmitting a measurement value such as pressure of a tire used in a vehicle to a controller provided in a vehicle body in a radio manner, and for example, evaluating the measurement value for an alarm message to a driver has been proposed. An example of the related art is disclosed in Japanese Examined Patent Application Publication No. 3494440, FIGS. 3 and 5. In such a radio transmission apparatus, a controller as shown in FIG. 4 is provided in a vehicle body and a measured-value transmitter (transponder) as shown in FIG. 5 is provided in the tire.

As shown in FIG. 4, the controller includes a carrier wave oscillator G1 generating a carrier wave (f1) of about 2.4 GHz, a modulator MO1, and an oscillator (modulation wave oscillator) G2 outputting an excitation signal. The oscillator G2 outputs an excitation signal with a frequency (f2) close to a resonance frequency of a resonator of a transponder to the modulator MO1. The carrier wave from the carrier wave oscillator G1 is modulated in amplitude by the excitation signal from the oscillator G2, a high frequency signal of 2.4 GHz modulated in amplitude is amplified by an amplifier (not shown), and then the signal is emitted from an antenna A1.

The controller includes a switch S1 determining modulation or non-modulation in amplitude by the modulator MO1, a receiver E1 receiving the high frequency signal emitted from the transponder and calculating a measurement value (S1) such as the pressure of the tire, and a timer T1 controlling a switching time of the switch S1 and a state of the receiver E1. The modulation or non-modulation in amplitude of the carrier wave is determined by the timer T1, the high frequency signal modulated in amplitude is transmitted for a predetermined period, and then the modulation in amplitude stops at a point of time t1 to transmit the non-modulation carrier wave. The receiver E1 is activated at the point of time t2 within about 1 µs after the point of time t1 and receives the high frequency signal from the transponder through an antenna A4.

As shown in FIG. 5, the transponder includes low pass filters L11/C11, a diode D11 serving as modulator/demodulator, a capacitive pressure sensor (hereinafter, referred to as 'pressure sensor') SC11 in which capacitance varies depending on the pressure of the tire, and a resonator having a crystal resonator Q11 excited by the excitation signal of the high frequency signal from the controller. The excitation signal is extracted from the high frequency signal from the controller by the low pass filter L11/C11 and the high frequency signal is modulated by the diode D11. In this manner, the excitation signal of the oscillator G2 is extracted. Since the resonance frequency of the resonator is close to the frequency of the excitation signal of the oscillator G2, the resonator is excited by the excitation signal. The resonance signal of the resonance frequency is generated by the excitation. When the capacitance of the pressure sensor SC11 varies depending on the pressure of the tire, the resonance frequency of the resonator varies. Accordingly, the resonance frequency of the resonance signal is affected by the variation.

As described above, the controller transmits the high frequency signal modulated in amplitude, stops the modulation in amplitude, and transmits the non-modulation carrier wave even when the modulation in amplitude stops. The resonator continuously oscillates about 1 ms or more. For the reason, the non-modulation carrier wave from the controller is modulated in amplitude by the diode D11 based on the resonance signal of the resonator and is emitted from an antenna A3. The receiver E1 receives the high frequency signal modulated in amplitude through the antenna A4 and extracts the resonance signal through a demodulator (not shown), thereby calculating a measurement value S1 such as the pressure of the tire.

However, in the above-mentioned radio transmission apparatus, the resonance frequency of the resonator of the transponder sequentially varies and the crystal resonator Q11 is used as the resonator. Accordingly, it is possible to perform the communication in which the Q value of the resonator is greatly stabilized. On the contrary, since the band of the resonance frequency is narrow, a usable frequency band of the excitation signal becomes narrow. When the frequency of the excitation signal of the oscillator G2 is out of the resonance frequency of the resonator, a response of the resonator becomes small. As a result, it is difficult to accurately detect the tire information such as the pressure of the tire. The same problems occur even when the resonator is not the crystal resonator. However, since the crystal resonator has high Q value, the problems become prominent.

In order to cope with the above-mentioned problem, in the known radio transmission apparatus, the frequency of the excitation signal generated by the oscillator G2 is slightly varied in a predetermined range to be outputted to the transponder so as to approximate the frequency of the excitation signal to the resonance frequency of the resonator, and the response of the resonator is determined, thereby adjusting the frequency of the excitation signal. However, in this case, the time for adjusting the frequency of the excitation signal is required and it takes a long time until the tire information such as the pressure of the tire is detected.

SUMMARY OF THE INVENTION

The invention has been made to solve the above-mentioned problems, and an object of the invention is to provide a tire information detector capable of promptly and accurately detecting the tire information such as the pressure of the tire.

A tire information detector according to the invention includes a measurement value transmitter including a resonator and disposed in a tire of a vehicle; and a controller disposed in a vehicle body, transmitting an excitation signal allowing the resonator to resonate to the measurement value transmitter, receiving a resonance signal concerning a resonance frequency of the resonator, and calculating a measurement value in accordance with the resonance frequency of the resonator. The controller determines a frequency of the excitation signal based on the resonance frequency of the resonator obtained from previous communications with the measurement value transmitter.

With such a configuration, the frequency of the excitation signal for allowing the resonator to resonate is determined based on the resonance frequency of the resonator obtained from the previous communications with the measurement value transmitter. Accordingly, it is possible to raise the response in resonance of the resonator from the beginning and to promptly and accurately detect the tire information such as the pressure of the tire.

In the tire information detector, for example, the controller may determine the frequency of the excitation signal based on the resonance frequency of the resonator obtained from the last previous communication with the measurement value transmitter. In this case, since it is possible to set the frequency of the excitation signal as a frequency close to the present resonance frequency, it is more possible to raise the response in resonance of the resonator from the beginning.

In the tire information detector, the controller may determine the frequency of the excitation signal based on an average value of the resonance frequencies of the resonator obtained from a plurality of the last previous communications with the measurement value transmitter. In this case, since the frequency of the signal for allowing the resonator to resonate is determined based on the average value of the resonance frequencies of the resonator obtained from the plurality of last previous communications with the measurement value transmitter, it is possible to reduce deviation or fluctuation in frequency occurring from noises in an individual communication.

In the tire information detector, the controller may determine the frequency of the excitation signal based on the frequency of the excitation signal used to obtain the resonance frequency of the resonator from the previous communications with the measurement value transmitter. In case of the modification in this manner, the same effect mentioned above can be obtained.

In the tire information detector, the controller may sequentially change the frequency of the excitation signal in a predetermined band adjacent to the frequency and determines the frequency of the excitation signal when the controller does not receive the resonance signal concerning the resonance frequency of the resonator in response to the excitation signal of the determined frequency. In this case, it is possible to reduce the time required to obtain the frequency of the excitation signal allowing the resonator to resonate in comparison with the case where the search is performed in the wide frequency band in which the resonance frequency of the resonator can vary.

In the tire information detector, the controller may sequentially change the frequency of the excitation signal in a band in which the resonance frequency of the resonator varies and determines the frequency of the excitation signal when the controller does not receive the resonance signal concerning the resonance frequency of the resonator in response to the excitation signal of the determined frequency. In this case, it is possible to obtain the frequency of the excitation signal, in response to which the resonance signal concerning the resonance frequency of the resonator can be surely received.

In the tire information detector, the resonator may be a crystal resonator. In this case, it is possible to provide the tire information detector having the above-described effect while the crystal resonator has the high Q value.

According to the invention, it is possible to provide a tire information detector capable of promptly and accurately detecting the tire information such as the pressure of the tire.

DESCRIPTION OF THE PREFERRED EMBODIMENT

Hereinafter, an embodiment of the invention will be described with reference to the attached drawings. A tire information detector according to the embodiment includes a controller disposed in a vehicle body and a measurement value transmitter (hereinafter, referred to as 'transponder') in the same manner as the tire information detector (radio transmission apparatus) described in the related art. Hereinafter, particularly, a detection target of the present tire information detector is described as pressure of the tire, but may be applied to the other detection targets, for example, structure stress.

Figure 1:
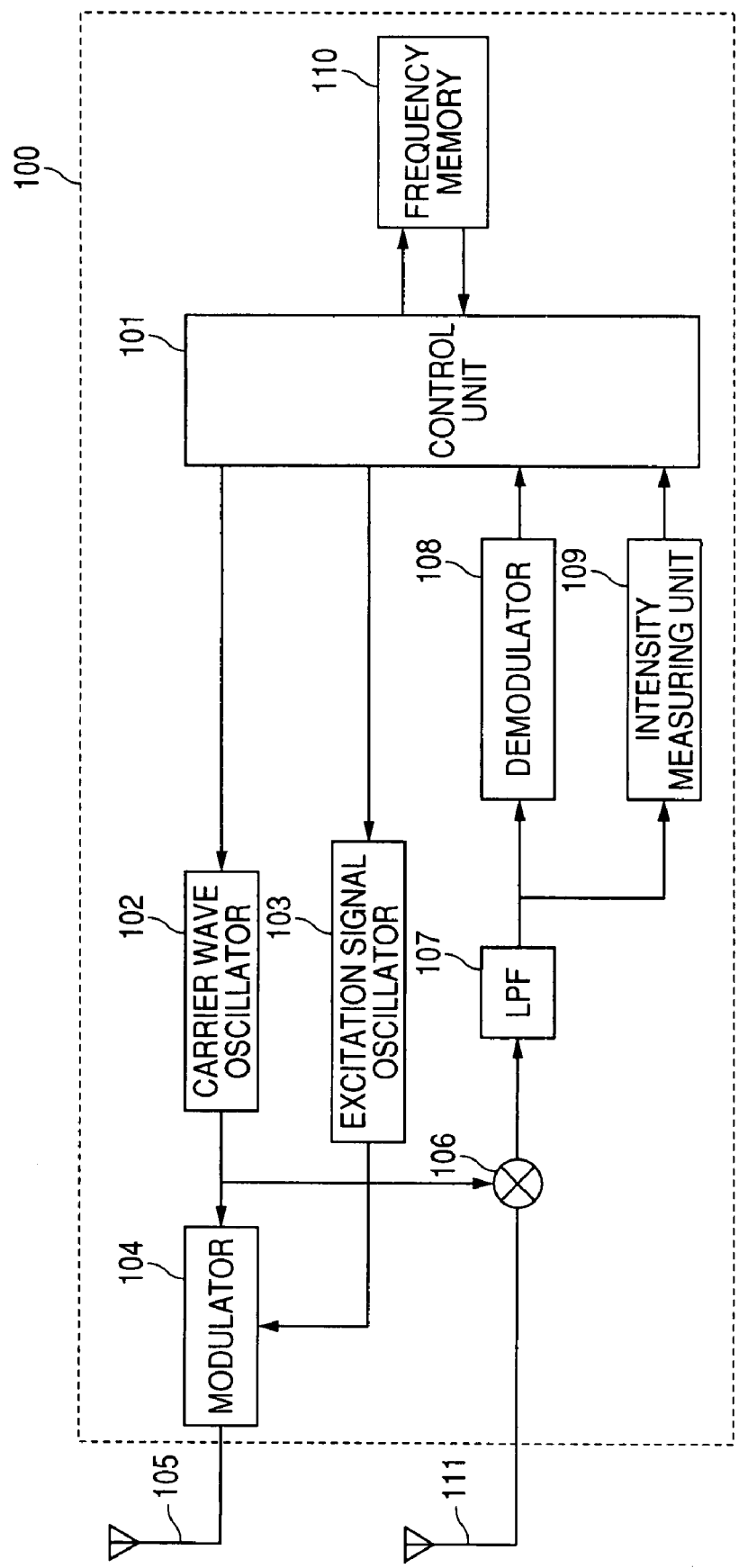
FIG. 1 is a block diagram illustrating a configuration of a controller constituting a tire information detector according to an embodiment of the invention.
Figure 5:
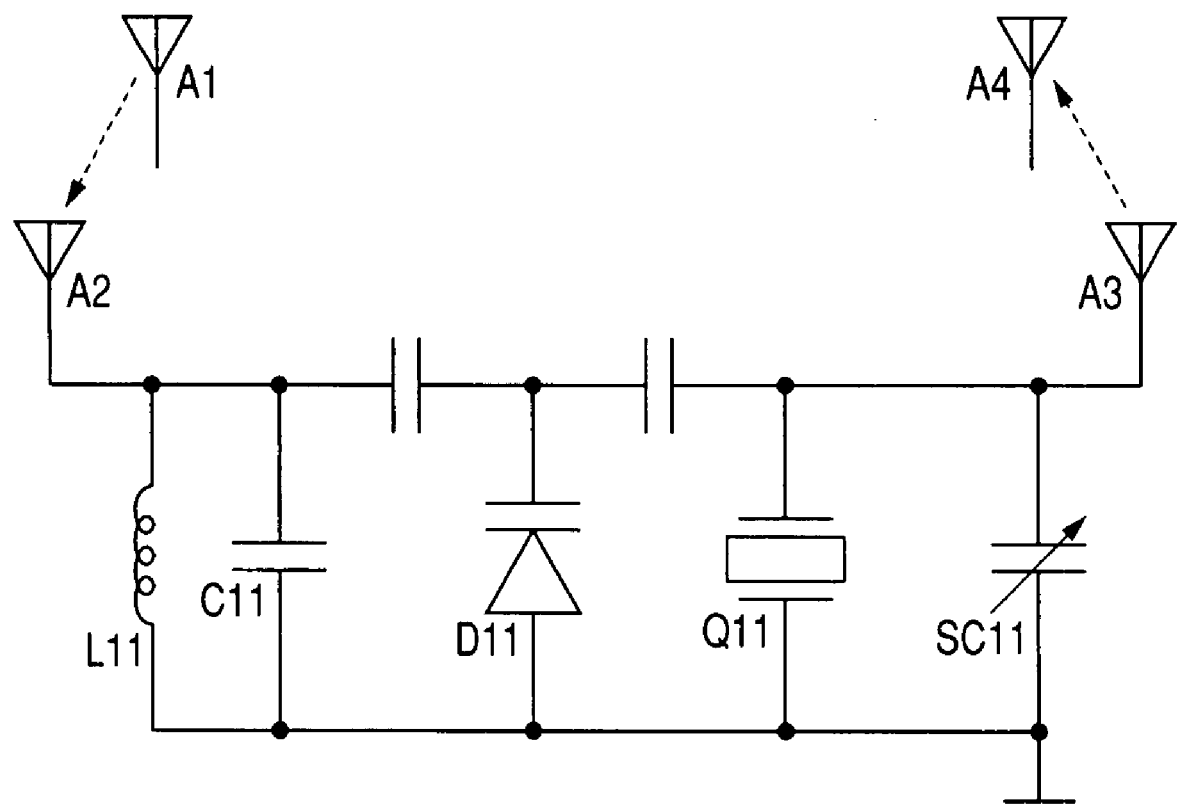
FIG. 5 is a schematic circuit diagram illustrating a configuration of a transponder constituting the known tire information detector.

FIG. 1 is a block diagram illustrating a configuration of a controller constituting a tire information detector according to the embodiment. In the tire information detector according to the embodiment, since a transponder has the same configuration as the known tire information detector, the description thereof will be omitted with reference to the configuration of the transponder shown in FIG. 5.

As shown in FIG. 1, a controller 100 according to the embodiment includes a control unit 101 controlling the whole apparatus, a carrier wave oscillator 102 generating a carrier wave of 2.4 GHz, an excitation signal oscillator 103 generating an excitation signal, and a modulator 104 modulating the carrier wave from the carrier wave oscillator 102 by using the excitation signal from the excitation signal oscillator 103.

The excitation signal oscillator 103 generates the excitation signal with a frequency close to a resonance frequency of a resonator (hereinafter, referred to as 'resonator') of a transponder. The modulator 104 modulates the carrier wave from the carrier wave oscillator 102 in amplitude by using the excitation signal inputted from the excitation signal oscillator 103. The high frequency signal of 2.4 GHz modulated in amplitude is amplified by an amplifier (not shown) and then emitted from an antenna 105 adjacent to the tire. The frequency of the excitation signal outputted from the excitation signal oscillator 103 is adjusted by the control unit 101, as described below.

The controller transmits the high frequency signal modulated in amplitude by a timer control to the transponder, stops the modulation in amplitude, transmits the non-modulation carrier wave, and receives the high frequency signal modulated in amplitude by the resonance signal of the resonator at the time of receiving the non-modulation carrier wave. Since the above-described process is the same as that in the known tire information detector, the description of this process is omitted.

The controller 100 includes a mixer 106 mixing the high frequency signal received from the transponder and the carrier wave outputted from the carrier wave oscillator 102 with each other, a low pass filter (LPF) 107 through which the resonance signal passes, a demodulator 108 demodulating the resonance signal, an intensity measuring unit 109 measuring the intensity (hereinafter, referred to as 'signal intensity') of the resonance signal, and a frequency memory 110 storing the resonance frequency of the resonator.

The high frequency signal received from the transponder through an antenna 111 is inputted to the mixer 106, is mixed with the carrier wave from the carrier wave oscillator 102, and then is inputted to the LPF 107. The resonance signal passing through the LPF 107 is modulated by the modulator 108 and then the modulated resonance signal is inputted to the control unit 101. The control unit 101 extracts the resonance frequency of the resonator from the modulated and inputted resonance signal and then calculates the pressure of the tire in accordance with the resonance frequency. For example, the control unit 101 calculates the pressure of the tire with reference to a table where the pressure of the tire corresponds to the resonance frequency of the resonator or a table where the amount of variation in pressure of the tire corresponds to the amount of variation in resonance frequency of the resonator. The calculation of the pressure is not limited to this method, and for example, the pressure may be calculated by adding an equation to a program.

The intensity of the resonance signal passing through the LPF 107 is measured by the intensity measuring unit 109 and the measurement result is inputted to the control unit 101. When the control unit 101 compares the measured result of the signal intensity and the modulated resonance signal with a predetermined reception condition and the signal intensity is equal to or larger than a predetermined value and satisfies the reception condition, the frequency of the resonance signal is employed as the resonance frequency of the resonator. The employed resonance frequency is stored in the frequency memory 110.

In a situation where the resonance frequency of the resonator varies with a variation in pressure of the tire, the controller 100 according to the embodiment detects the frequency (hereinafter, referred to as 'excitation frequency') of the excitation signal generated by the excitation signal oscillator 103 by using the resonance frequency of the resonator obtained from the previous communications with the transponder, thereby promptly and accurately detecting the pressure of the tire.

Specifically, the controller 100 according to the embodiment determines the excitation frequency in the later communication in accordance with the resonance frequency of the resonator caught from the previous communications with the transponder. When the response of the transponder responding to the excitation frequency is small, that is, when the resonance frequency of the resonator is significantly out of the excitation frequency, the controller 100 performs a narrowband searching process of searching a present resonance frequency by sequentially varying the excitation frequency in a narrow frequency band in the vicinity of the excitation frequency. Even when the present resonance frequency is not detected in the narrowband searching process, a wideband searching process of searching the present resonance frequency in a frequency band wider than that of the narrowband searching process is performed. However, the frequency band in this case is in the range in which the resonator can resonate.

Figure 2:
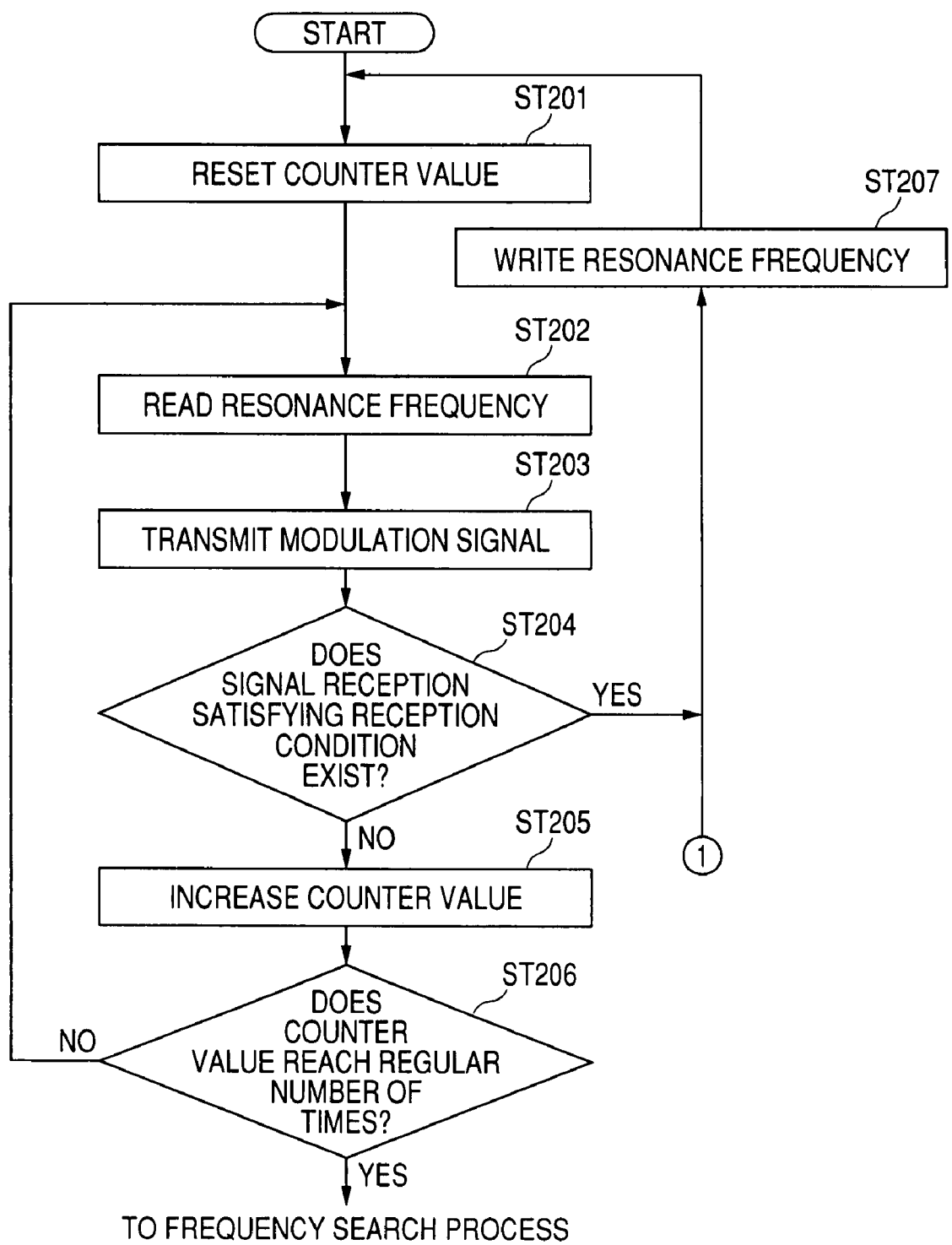
FIG. 2 is a flowchart illustrating a process at the time of searching a resonance frequency of a resonator with the controller according to embodiment.
Figure 3:
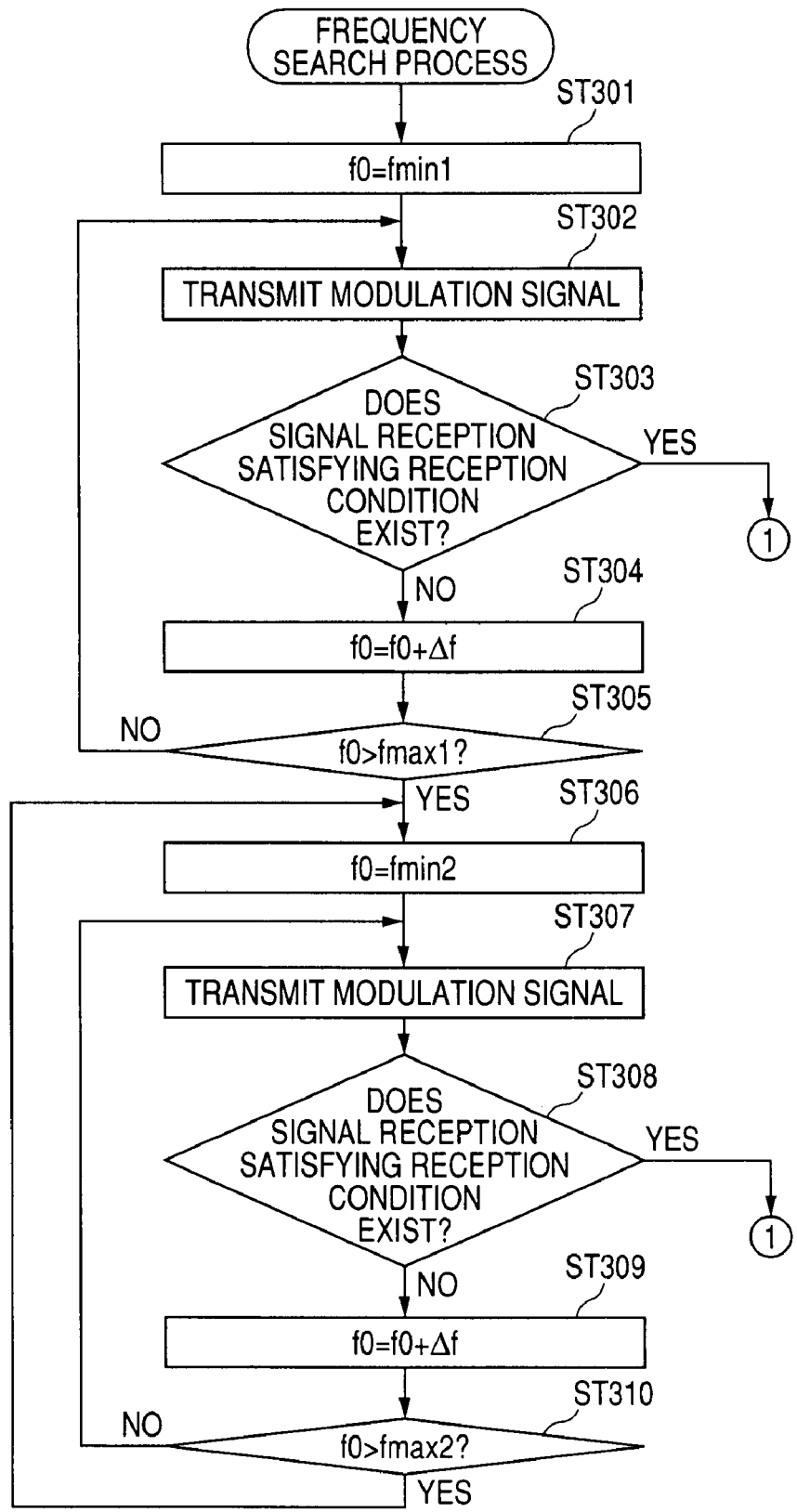
FIG. 3 is a flowchart illustrating a process at the time of searching a resonance frequency of a resonator with the controller according to embodiment.
Figure 4:
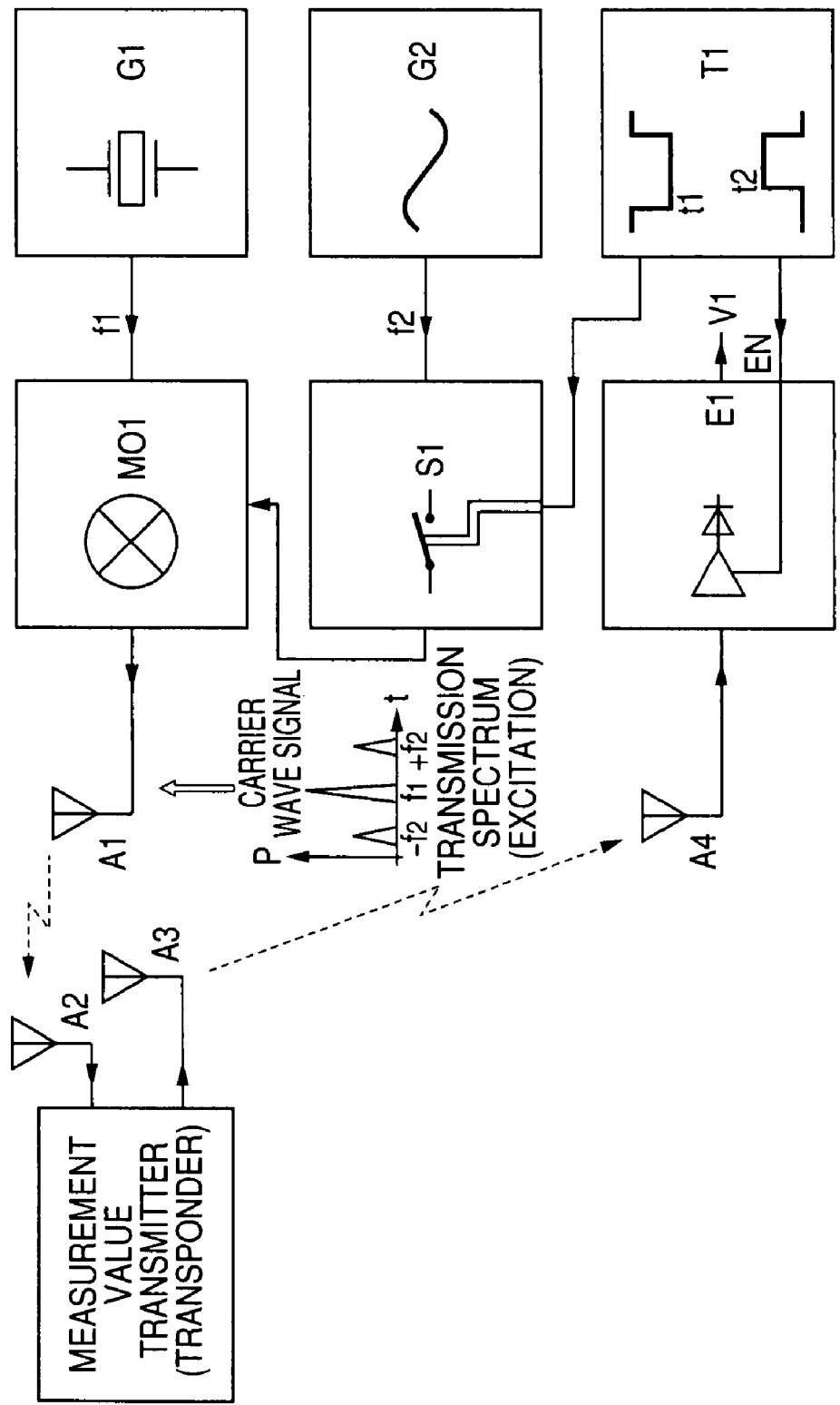
FIG. 4 is a schematic circuit diagram illustrating a configuration of a controller constituting the known tire information detector.

Hereinafter, the process of searching the resonance frequency of the resonator by the controller according to the embodiment will be described with reference to FIGS. 2 and 3. FIGS. 2 and 3 are flowcharts illustrating processes at the time of searching the resonance frequency of the resonator with the controller according to the invention.

In FIGS. 2 and 3, it is considered that the resonance frequency of the resonator is caught in advance at the previous communication in advance and the previous resonance frequency is stored in the frequency memory 110. When the tire information detector is activated and then the resonance frequency of the resonator is initially stored in the frequency memory 110, any method may be selected. For example, when the excitation frequency is changed to a predetermined frequency pitch in the frequency band in which the resonance frequency of the resonator is variable to obtain the resonance signal, the obtained frequency may be stored as the resonance frequency of the resonator. Herein, in case of using an oscillator as the resonator, the measurement starts from the lower frequency in order to avoid spuriousness.

When the communication with the transponder is performed with the previous resonance frequency of the resonator stored in the frequency memory 110, the control unit 101 resets a value (hereinafter, referred to as 'counter value') of a counter (not shown) counting the number of the repeated communication process at the same excitation frequency (step (hereinafter, referred to as 'ST') 201).

After counter value is reset, controller 101 reads the previous resonance frequency stored in the frequency memory 110 (ST 202). Then, the controller 101 instructs the excitation signal oscillator 103 to generate the excitation signal with the excitation frequency corresponding to the previous resonance frequency. The modulator 104 modulates the carrier wave from the carrier wave oscillator 102 by using the excitation signal from the excitation signal oscillator 103 and then the modulated signal (hereinafter, referred to as 'modulation signal') is transmitted to the transponder through the antenna 105 (ST 203).

When the modulation signal transmitted from the controller 100 includes the frequency component of the resonance frequency of the resonator of the transponder, the resonator is excited. Thus, the resonance signal of the resonator is generated by this excitation. The non-modulation carrier wave from the controller 100 is modulated in amplitude in accordance with this resonance signal and outputted from the transponder to the controller 100. The controller 100 receives the signal modulated in amplitude as described above through the antenna 111. The demodulator 108 demodulates the resonance signal from this signal and the signal intensity measuring unit 109, the signal intensity of this signal is measured, and the measurement result is transmitted to the control unit 101. At this time, the control unit 101 calculates the pressure of the tire based on the resonance frequency of the received and modulated resonance signal.

After the modulation signal is transmitted, the control unit 101 monitors the reception of the resonance signal satisfying a predetermined reception condition (ST 204). Herein, the reception condition in the embodiment is as the follows: A. S/N ratio of the resonance signal received from the transponder is 9 dB or more, B. The frequency of the resonance signal is within a regulated value, and C. Dispersion of the frequency of the resonance signal is within a regulated value. In B, the range of the variation in resonance frequency can be presumed from the relation between the pressure and the resonance frequency in advance. Accordingly, if the frequency is out of the range, it is recognized that the frequency is an abnormal value irrelative to the variation in pressure. In C, the dispersion of the frequency is presumed from the property of the resonator, the dispersion in advance. Accordingly, if the dispersion is out of the range, it is determined that there is abnormality due to any reason.

When there is no reception of the resonance signal satisfying the reception condition, the control unit 101 increases the counter value (ST 205). It is judged whether the increased counter value reaches the predetermined number of regular times (i.e. 100 times) (ST 206). When the counter value does not reach the number of regular times, it returns to ST 202 and then the process after ST 202 is repeated again.

The process is repeated plural times since the communication state between the controller and the transponder sequentially varies with the rotation of the tire and thus there is a case where the resonance signal satisfying the reception condition is not obtained due to no relation to the frequency of the excitation signal.

In ST 204, when the reception of the resonance signal satisfying the reception condition is conformed, the resonance frequency of the resonance signal is stored in the frequency memory 110 as the present resonance frequency of the resonator in the frequency memory 110 (ST 207). Then, it returns to ST 201 to prepare the next process.

As described above, in the controller according to the embodiment, the excitation frequency is determined based on the previous resonance frequency read from the frequency memory 110 and the excitation signal according to the excitation frequency is transmitted to the transponder. When the transmission of the excitation signal is repeated by the number of the regular times (i.e. 100 times) and then the signal satisfying the reception condition is received during the repeated period, the previous resonance frequency is stored as the present resonance frequency.

In ST 206, when the counter value reaches the number of the regular times, the control unit 101 performs the frequency searching process shown in FIG. 3. Herein, the frequency searching process means that the present resonance frequency of the resonator sequentially varying depending on the pressure of the tire is searched. In the frequency searching process, the control unit 101 performs the narrowband searching process of searching the frequency in the narrowband in the vicinity of the previous resonance frequency of the resonator read in ST 202 (ST 301 to ST 305). When the present resonance frequency is not searched by the narrowband searching process, the wideband searching process of searching the frequency in the band where the resonance frequency of the resonator is changeable is performed (ST 306 to ST 310).

When the frequency searching process starts, the control unit 101 sets a frequency (hereinafter, referred to as 'search target frequency') f0 which is a search target as the minimum frequency (hereinafter, referred to as 'first minimum frequency') fmin1 in the narrowband searching process (ST 301). Herein, the search target frequency is designated as the frequency of the excitation signal generated by the excitation signal oscillator 103. Further, as the first minimum frequency fimn1, a frequency lower than the previous resonance frequency read in ST 202 by a predetermined value is selected.

The search target frequency f0 is set as the first minimum frequency fmin1, the control unit 101 modulates the carrier wave from the carrier wave oscillator 102 by using the excitation signal of the first minimum frequency fmin1, and then the control unit 101 transmits the modulation signal to the transponder (ST 302). After the modulation signal is transmitted, the reception of the resonance signal from the transponder, satisfying a predetermined reception condition, is monitored (ST 303) in the same as ST 204.

When the resonance signal satisfying the reception condition is not received, the control unit 101 renews the search target frequency f0 (ST 304). Specifically, the search target frequency f0 is set as a frequency heightened by a predetermined frequency pitch (Δf). When the frequency searching process starts and then the search target frequency f0 is initially renewed in ST 304, a frequency in which Δf is added to the first minimum frequency fmin1 is set as the search target frequency f0.

After the search target frequency f0 is renewed, it is judged that the search target frequency f0 is higher than the maximum frequency (hereinafter, referred to as 'first maximum frequency') fmax1 in the narrowband searching process (ST 305). Herein, as the first maximum frequency fmax1, a frequency higher than the previous resonance frequency read in ST 202 by a predetermined value is selected.

When the search target frequency f0 is not higher than the first maximum frequency fmax1, the control unit 101 performs the process after ST 302, returning to ST 302. In this manner, it is possible to search the present resonance frequency of the resonator in a predetermined frequency band based on the previous resonance frequency while the search target frequency f0 is renewed. It is possible to shorten a time to determine the frequency of the signal for allowing the resonator to resonate in comparison with the case of searching the wideband in which the resonance frequency of the resonator is variable.

When the reception of the resonance signal satisfying the reception condition is confirmed in ST 303 during the repetition of the processes of ST 302 to ST 305, the process of ST 207 is performed and the resonance frequency of the received resonance signal is stored in memory 110 as the present resonance frequency of the resonator (ST 207). Then, it returns to ST 201 for preparing the next process.

When the search target frequency f0 is higher than the first maximum frequency fmax1 in ST 305 during the repetition of the processes of ST 302 to ST 305, the controller 101 sets the search target frequency f0 as a minimum frequency (hereinafter, referred to as 'second minimum frequency') fmin2 in the wideband searching process (ST 306). Herein, a minimum frequency in which the resonance frequency of the resonator varies is selected as the second minimum frequency fmin2.

After the search target frequency f0 is set as the second minimum frequency fmin2, the control unit 101 modulates the carrier wave from the carrier wave oscillator 102 by using the excitation signal of the second minimum frequency fmin2 and transmits the modulation signal to the transponder (ST 307). After the modulation signal is transmitted, the reception of the resonance signal satisfying a predetermined reception condition from the transponder is monitored in the same as ST 204 and ST 303 (ST 308).

When the resonance signal satisfying the reception condition is not received, the controller 101 renews the search target frequency f0 (ST 309) in the same manner as the narrowband searching process (ST 304). Specifically, the search target frequency f0 is set as a frequency heightened by a predetermined frequency pitch (Δf). When the frequency searching process starts and then the search target frequency f0 is initially renewed in ST 309, a frequency in which Δf is added to the second minimum frequency fmin2 is set as the search target frequency f0.

After the search target frequency f0 is renewed, it is judged that the search target frequency f0 is higher than the maximum frequency (hereinafter, referred to as 'second maximum frequency') fmax2 in the wideband searching process (ST 310). Herein, as the second maximum frequency fmax2, a maximum frequency in which the resonance frequency of the resonator varies is selected.

Herein, when the search target frequency f0 is not higher than the second maximum frequency fmax2, the control unit 101 performs the process after ST 307 again, returning to ST 307. In this manner, it is possible to search the present resonance frequency of the resonator in a frequency band in which the resonance frequency of the resonator varies while the search target frequency f0 is renewed. It is possible to obtain the excitation frequency for surely catching the resonance frequency of the resonator.

When the reception of the resonance signal satisfying the reception condition is confirmed in ST 308 during the repetition of the processes of ST 307 to ST 310, the process of ST 207 is performed and the resonance frequency of the received resonance signal is stored in memory 110 as the present resonance frequency of the resonator (ST 207). Then, it returns to ST 201 for preparing the next process.

The predetermined pitch $\Delta f$ in the narrowband searching process may be different from the predetermined pitch $\Delta f$ in the wideband searching process. Generally, it is efficient that the former is set to be small and the latter is set to be large.

When the search target frequency f0 is higher than the second maximum frequency fmax2 in ST 310 during the repetition of the processes of ST 307 to ST 310, the control unit 101 performs the process after ST 306 again, returning to ST 306. Herein, when the present resonance frequency of the resonator cannot be searched in the wideband searching process (ST 306 to ST 310), it returns to ST 306 and the wideband searching process is repeated. However, the process is not limited thereto, but it may return to ST 301 and the repeated process may begin from the narrowband searching process.

In the tire information detector according to the embodiment, the controller 100 determines the frequency of the excitation signal for allowing the resonator to resonate based on the resonance frequency of the resonator obtained from the previous communications with the transponder. Accordingly, it is possible to raise the response in resonance of the resonator from the beginning and to promptly and accurately detect the tire information such as the pressure of the tire.

Particularly, in the tire information detector according to the embodiment, the controller 100 determines the frequency of the excitation signal for allowing the resonator to resonate based on the resonance frequency of the resonator obtained from the last previous communication with the transponder. For the reason, it is possible to further raise the response in resonance of the resonator.

The invention is not limited to the above-described embodiment and may be modified to be variously embodied. In the embodiment, the size, the shape, or the like shown in the attached drawings is not limited thereto, but may be appropriately modified so long as the advantage of the invention can be obtained and be appropriately modified so long as it does not deviate from the object of the invention.

For example, in the tire information detector according to the embodiment, the controller 100 determines the frequency of the excitation signal based on the resonance frequency of the resonator obtained from the last previous communication with the transponder. However, the process at the time of determining the frequency of the excitation signal is not limited thereto and may be appropriately modified. For example, the frequency of the excitation signal may be determined based on the average value of the resonance frequencies obtained from the plurality of the last previous communications, instead of the resonance frequency obtained from the last previous communication. In addition to the use of the resonance frequency obtained from the last previous communication, the frequency shifted by a predetermined value may be used in accordance with the property of a circuit. In addition, the average value may employ a weighted average value for application. That is, the invention may be applied in the other manner so long as the application is not out of the main sense of the invention in which the excitation frequency is determined by using the resonance frequency obtained from the previous communications.

In the tire information detector according to the invention, when the modulation signal is transmitted from the controller 100 and then the resonance signal satisfying a predetermined reception condition is received, the present resonance frequency of the resonator is stored in the frequency memory 110 and the excitation frequency corresponding to the resonance frequency stored in the frequency memory 110 in the later communication with the transponder is used. However, the target stored in the frequency memory 110 and used in the later communication is not limited to the resonance frequency and may be appropriately modified. For example, the excitation frequency for the case where the resonance signal satisfying a predetermined reception condition is received may be recorded and may be used for the later communication.

In the tire information detector, the search target frequency f0 is set as the first minimum frequency fmin1 or the second minimum frequency fmin2 and then the search target frequency f0 is gradually increased by a predetermined frequency pitch, in the frequency searching process (narrowband searching process and wideband searching process). However, the process of searching the resonance frequency of the resonator is not limited thereto and may be appropriately modified. For example, in the narrowband searching process, the search target frequency f0 is set from a frequency close to the previous resonance frequency and then may be gradually set to a frequency far from the previous resonance frequency. In this case, the search target frequency f0 may be set to increase or decrease from the previous resonance frequency by a predetermined resonance frequency pitch or may be set to increase and decrease from that.

In the tire information detector according to the embodiment, the type of the resonator is not specified, but an LC resonator, a resonator including a ceramic resonator and a single crystal resonator, or the like may be applied. Among them, the resonator formed of the crystal resonator may allow a stable communication to be performed since the crystal resonator has a high Q value. Therefore, since the resonator formed of the crystal resonator is the most suitable for measuring the pressure of the tire, the resonator formed of the crystal resonator is the most useful in the invention.

What is claimed is:

1. A tire information detector comprising:
    a measurement value transmitter including a resonator and disposed in a tire of a vehicle; and
    a controller disposed in a vehicle body, transmitting an excitation signal allowing the resonator to resonate to the measurement value transmitter, receiving a resonance signal concerning a resonance frequency of the resonator, and calculating a measurement value in accordance with the resonance frequency of the resonator,
    the controller determining a frequency of the excitation signal based on the resonance frequency of the resonator obtained from previous communications with the measurement value transmitter.

2. The tire information detector according to claim 1, wherein the controller determines the frequency of the excitation signal based on the resonance frequency of the resonator obtained from the last previous communication with the measurement value transmitter.

3. The tire information detector according to claim 1, wherein the controller determines the frequency of the excitation signal based on an average value of the resonance frequencies of the resonator obtained from a plurality of the last previous communications with the measurement value transmitter.

4. The tire information detector according to claim 1, wherein the controller determines the frequency of the excitation signal based on the frequency of the excitation signal used to obtain the resonance frequency of the resonator from the previous communications with the measurement value transmitter.

5. The tire information detector according to claim 1, wherein the controller sequentially changes the frequency of the excitation signal in a predetermined band adjacent to the frequency and determines the frequency of the excitation signal when the controller does not receive the resonance signal concerning the resonance frequency of the resonator in response to the excitation signal of the determined frequency.

6. The tire information detector according to claim 5, wherein the controller sequentially changes the frequency of the excitation signal in a band in which the resonance frequency of the resonator varies and determines the frequency of the excitation signal when the controller does not receive the resonance signal concerning the resonance frequency of the resonator in response to the excitation signal of the determined frequency.

7. The tire information detector according to claim 1, wherein the resonator is a crystal resonator.

* * * * *